Patented Oct. 30, 1934

1,978,727

UNITED STATES PATENT OFFICE 1,978,727

PAINT

George F. A. Stutz and Adolf C. Elm, Palmerton, Pa., assignors to The New Jersey Zinc Company, New York, N. Y., a corporation of New Jersey No Drawing. Application April 24, 1930, Serial No. 447,101

5 Claims. (Cl. 134—78)

This invention relates to paint and particularly to paint containing pigment and oleoresinous vehicle. The invention aims to provide a method of improving the physical and colloidal properties of the paint, in particular, the leveling and working properties of the paint, especially of a gloss paint, and, in particular, of a paint containing lithopone.

The physical and colloidal properties of a paint determine its consistency characteristics, its ease of working, ease of brushing, its flow characteristics, its ability to level, and its aging properties such as non-settling, thickening and the like. The leveling quality of a paint is its ability to flow out and obliterate brush marks and to assume, when dry, a uniformly smooth and even surface. Good leveling is desirable in all paints and is of special significance in gloss paints such as enamels. A number of white pigments, including lithopone, are widely used as white pigments in gloss as well as in flat paints and considerable difficulty has heretofore been encountered in dispersing these pigments in the vehicle, particularly an oleoresinous vehicle, so as to secure satisfactory leveling in the resulting paint.

The present invention is particularly concerned with the improvement in the dispersing properties of pigments, and in particular lithopone, so as to secure superior leveling and working properties, particularly in gloss paint. To this end the invention contemplates certain improvements in the manufacture of pigments and particularly of lithopone by which the dispersing properties of the pigment are materially improved. The contemplated improvement in the dispersing properties of lithopone or of other pigments may be effected through the medium of the vehicle rather than through the pigment itself. Hence, in a broader aspect, the invention contemplates the improvement of the leveling and working qualities of paints in general.

The invention is based on our discovery that the dispersing properties of a pigment, such as lithopone, in a paint vehicle are substantially improved by the presence of a salicyl compound during the incorporation of the pigment in the vehicle. The salicyl compound may be salicylic acid or any salt or ester of salicyclic acid, or any appropriate organic derivative of salicylic acid and may be initially associated with either the pigment or the vehicle.

In the practice of the invention we prefer to associate a salicyl compound with the lithopone or with the pigment at some appropriate stage in its course of manufacture. In the case of lithopone this is preferably done after calcination. Thus we have secured satisfactory results by adding less than 0.5% of salicylic acid (calculated by weight on the dry weight of the pigment) to the ball mill during the finish grinding or to the finished pulp at any point, or to the dry pigment during disintegration. Greater amounts of salicylic acid do not give correspondingly greater improvement, and have not been found necessary in actual practice. Salicylic acid, when thus added to the pigment, and in particular to lithopone, is adsorbed in part at least by the pigment and is probably converted in part at least into a salt of salicylic acid—for example, the barium, calcium, magnesium, sodium or zinc salt of salicylic acid in the case of lithopone.

The addition of a salicylate, such as sodium or magnesium salicylate, to the pigment, gives substantially the same result with respect to improved leveling and working as does salicylic acid. The addition of an ester or other organic derivative of salicylic acid, such as acetyl salicylic acid, methyl salicylate, acetyl salicyl aldehyde diacetate, salicyl amide, salicyl aldehyde or the like, to the pigment gives substantially the same result with respect to improved leveling and working properties as does salicylic acid. The addition of a salicyl compound to pigments such as zinc sulphide, titanium dioxide, zinc oxide, titanium barium pigment and the like gives substantially the same result with respect to improved leveling and working as in the case of lithopone.

It is probable that the salicyl compound added to the pigment is finally orientated at the interface between the pigment surface and the vehicle forming a third phase markedly influencing the interfacial reactions such as the wetting and dispersing characteristics of the vehicle for the pigment. It is probable that the polar nature of the agent with its carboxyl group and its hydroxy group in connection with the benzene ring is responsible for the adsorption on the surface of the pigment. That the polar nature of the agent is particularly responsible for its action is indicated by the fact that salicylic acid is somewhat superior to either methyl salicylate or acetyl salicylic acid. The two latter materials are less polar than is salicylic acid itself.

Pigments embodying the improvement of the invention possess superior dispersing properties in paint vehicles, particularly of the oleoresinous type, resulting in paints of improved physical and colloidal properties. This superior dispersing property imparts to the paint a marked improvement in its leveling quality in particular and in its working characteristics, ease of flow, ease of brushing, non-settling characteristics and the like. It does not adversely affect any other property of the pigment and in particular does not cause the pigment to thicken in paint nor to discolor, nor does it appreciably affect the drying time.

As hereinbefore mentioned, the improvement in leveling properties and flow characteristics of the paint may be obtained by adding the salicyl compound, such as salicylic acid, or an appropriate salicylate directly to the vehicle or to the paint, rather than incorporating it in the pigment as hereinbefore particularly described. While it has been our experience that this alternative method is not entirely as efficient as our preferred practice, it has given satisfactory results in actual practice. While the improvement in leveling quality and flow characteristics of the invention shows to best advantage with a gloss or an enamel type of vehicle, a corresponding, although perhaps not as great improvement, is evident with semi-gloss and with flat vehicles.

We claim:—

1. The method of improving the dispersing properties of lithopone so as to secure improved leveling in paint made therefrom which comprises adding a small amount of salicylic acid to the calcined lithopone in the finishing stages of its manufacture.

2. The improvement in the manufacture of lithopone which comprises adding less than 0.5% by weight of salicylic acid to the dry calcined lithopone in the finishing stages of its manufacture.

3. A method of improving the dispersing properties of lithopone which comprises adding a small amount of a compound selected from the group consisting of salicylic acid, metallic salicylates, acetyl salicylic acid, methyl salicylate, acetyl salicyl aldehyde diacetate, salicyl amide, and salicyl aldehyde to the calcined lithopone in the finishing stages of its manufacture.

4. A method of improving the dispersing properties of lithopone which comprises adding a small amount of a compound selected from the group consisting of salicylic acid, sodium salicylate, magnesium salicylate, barium salicylate, calcium salicylate, zinc salicylate, acetyl salicylic acid, methyl salicylate, acetyl salicyl aldehyde diacetate, salicyl amide, and salicyl aldehyde to the calcined lithopone in the finishing stages of its manufacture.

5. A method of improving the dispersing properties of zinc sulfide pigment which comprises adding a small amount of a compound selected from the group consisting of salicylic acid, metallic salicylates, acetyl salicylic acid, methyl salicylate, acetyl salicyl aldehyde diacetate, salicyl amide, and salicyl aldehyde to the calcined zinc sulfide pigment in the finishing stages of its manufacture.

GEORGE F. A. STUTZ.
ADOLF C. ELM.